United States Patent Office 3,331,750
Patented July 18, 1967

3,331,750
METHOD FOR THE PREPARATION OF SALICYLIC ACID
Martin H. Rogoff, Bakersfield, Calif., assignor to International Minerals & Chemical Corporation, a corporation of New York
No Drawing. Filed May 3, 1965, Ser. No. 452,893
22 Claims. (Cl. 195—28)

The present invention relates to an improved method for preparing salicylic acid and more particularly to an improved method wherein relatively high yields of salicylic acid advantageously are produced by a fermentation of naphthalene.

Salicylic acid is a highly valuable compound which has found wide-spread utilization in many areas of chemical technology. Techniques heretofore available for preparing salicylic acid generally have entailed the utilization of relatively involved chemical synthesis in which intermediate compounds are subjected to a catalyzed oxidation to provide the desired hydroxy aromatic carboxylic acid. Although such techniques usually advantageously employ relatively inexpensive and available starting materials, with the exception of the catalysts, problems of catalyst and other process control with the attendant operating and investment expenditures have somewhat detracted from the overall commercial attractiveness of these methods. It further has been suggested to produce salicylic acid by fermentation of an appropriate starting material, such as naphthalene, with a microorganism. The approaches employing a fermentation method, however, heretofore have not provided sufficiently high yields of salicylic acid to render these methods commercially feasible. In the main, maximum salicyclic acid production corresponding to about 15 milligrams per milliliter of final fermentation broth have been obtained in the previously described fermentation approaches.

Accordingly, it is the primary object of the present invention to provide an improved method for preparing salicylic acid.

It is an additional object of the present invention to provide an improved method for producing salicylic acid by an efficient fermentation of a relatively inexpensive and readily available starting material.

Another object of the present invention is to provide an improved method for preparing salicylic acid by the fermentation of naphthalene wherein significantly higher yields of salicylic acid are obtained than heretofore observed in fermentation processes of a similar purpose.

A further object of the present invention is to provide a method for preparing salicylic acid by the fermentation of naphthalene wherein the salicylic acid-accumulation characteristics of the fermentation are significantly improved by the use of a nutrient medium additive which promotes salicylic acid accumulation.

Broadly described, the present invention provides a method for producing salicylic acid which comprises cultivating a salicylic acid-producing strain of Pseudomonas in an aqueous nutrient medium having a pH in the range of from about 5.5 to about 8 and containing naphthalene, an assimilable nitrogen source, an assimilable phosphorus source, and an amount of a stabilizing agent selected from the group consisting of pantothenic acid, L-glycine, and mixtures thereof which effects an increase in the rate of accumulation of salicylic acid in said medium.

By means of the utilization of pantothenic acid, L-glycine or combinations thereof in the present method significantly improved productions and accumulations of salicylic acid in naphthalene bacterial oxidations with microorganisms of the genus Pseudomonas advantageously may be obtained. For example, with techniques heretofore suggested, salicylic acid accumulations on the order of only about 15 mg. per ml. of final fermentation broth could be obtained, while, on the other hand, preparations carried out according to the present method differing only by an inclusion of effective amounts of pantothenic acid, L-glycine or pantothenic acid-L-glycine combinations yield final broths, even for identical fermentation times, containing salicylic acid accumulations ranging up to and over 20 mg. salicylic acid per ml. The present invention thus provides a simple, efficient, and economical means for producing salicylic acid from naphthalene.

The present invention contemplates the utilization of any salicylic acid-producing microorganism of the genus Pseudomonas. Specific examples of such microorganisms include, without limitation, strains of *Pseudomonas fluorescens, Pseudomonas aeruginosa, Pseudomonas salopia, Pseudomonas desmolytica, Pseudomonas rathonis, Pseudomonas cruciviac, Pseudomonas dachunac* and *Pseudomonas arvilla*. The more preferred microorganism for utilization is *Pseudomonas fluorescens*, typified by *Pseudomonas fluorescens*, Bioferm Strain No. 345–E, isolated from oil ditch drainage water.

The fermentation media employed in the present method constitute those which are capable of supporting growth of the above-described microorganisms and which comprise naphthalene, an assimilable nitrogen source, and an assimilable phosphorus source.

The naphthalene raw material employed in the fermentation of the present process suitably may be a crude or refined naphthalene such as a naphthalene fraction recovered from crude hydrocarbon mixtures such as petroleum, coal, shale oil, and the like. A particular advantage of the present method is that crude naphthalene containing such impurities as alkyl naphthalene, thiophene, benzthiophene, cresols, and the like, suitably may be employed without any appreciable sacrifice in the attainable salicylic acid production. This advantage is particularly realized in embodiments wherein the salicylic acid-producing microorganism is *Pseudomonas fluorescens*, Bioferm Strain No. 345–E.

In the initial fermentation medium the naphthalene concentration generally is in the range of from about 0.4 to about 4% and higher, preferably from about 0.5 to about 2.5% by weight of the total medium. In preferred embodiments of the method the naphthalene concentration throughout the fermentation is maintained at an excess, which generally corresponds to a naphthalene concentration of about 0.2% by weight. Consequently, throughout the fermentation additional naphthalene continuously or incrementally may be, and preferably is, added to the medium at an average rate of generally about 0.05 to about 0.15% per hour.

The assimilable nitrogen source suitably may be provided by any inorganic or organic nitrogenous substance conventionally employed in fermentation processes. Specific examples of such materials include ammonia, urea, ammonium compounds such as ammonium hydroxide, ammonium chloride, ammonium nitrate, ammonium sulfate, ammonium phosphate and the like, the nitrates of alkali and alkaline earth metals, e.g., sodium, potassium, lithium, calcium, barium, and magnesium nitrates, proteinaceous materials such as soybean meal, cottonseed meal, casein, autolyzed yeast and the like, and hydrolyzates and nitrogen-containing extracts of hydrolyzates of said proteinaceous materials. The more preferred nitrogen sources are provided by inorganic nitrogen-containing compounds, such as ammonium compounds, with the complex organic nitrogenous substances being less preferred for use.

In the initial fermentation medium, the concentration of the nitrogen source suitably may vary but generally is in the range of from about 0.1 to about 3% and higher, preferably from about 0.5 to about 1.5% by weight of the total medium.

The invention contemplates the utilization of any inorganic or organic assimilable phosphorus source. Specific examples of suitable substances include inorganic phosphate-containing materials such as phosphoric acid, ammonium phosphate, alkali metal, alkaline earth metal and other metal phosphates, such as sodium, potassium, calcium, magnesium and manganese phosphates and hydrogen phosphates, and organic phosphate-containing material such as lecithin, nucleotides, phytic acid and the like. The inorganic phosphate-containing substances constitute the more preferred phosphorus sources. Although the concentration of the phosphorus source suitably may vary, the initial nutrient medium generally contains from about 0.05 to about 1% and higher, preferably from about 0.075 to about 0.2% by weight of the phosphorus source.

The initial medium employed in the present method also suitably may contain small amounts of secondary mineral nutrients which generally are inorganic metal salts in the form of the chlorides, nitrates, sulfates, phosphates and the like of sodium, potassium, calcium, magnesium, manganese, zinc, iron, copper, cobalt, and the like. Such secondary nutrients may be added separately or may be present in complex nutrients utilized as the nitrogen and/or phosphorus source.

The initial fermentation medium preferably further contains a buffering agent to adjust the initial pH to a value in the range of from about 5.5 to about 8, preferably about 6.0 to about 7.5. Suitable buffering agents include calcium carbonate, sodium hydrogen phosphates, potassium hydrogen phosphates, ammonium hydrogen phosphates and the like.

In accordance with the present method, pantothenic acid suitably may be added to the medium in the form of pantothenic acid, ammonium pantothenate, alkali metal, e.g., lithium, sodium, and potassium pantothenates, alkaline earth metal, e.g., calcium, magnesium, barium, and the like pantothenates, and other metal, e.g., iron, copper, manganese, cobalt, and the like pantothenates. The actual amount of pantothenic acid employed in particular embodiments of the invention will vary depending primarily upon the particular microorganisms and nutrient medium employed. The criteria which is limiting on the minimum amount of pantothenic acid, is that a sufficient amount must be employed in order to provide an increase in total salicylic acid production as compared to that produced in the absence thereof. Generally, fermentations carried out in accordance with the present method are characterized by the use of fermentation media in which the concentration of pantothenic acid is in the range of from about 0.01 to about 10 $\gamma$/ml., preferably from 0.05 to about 5 $\gamma$/ml. of total medium.

The invention contemplates embodiments wherein all, or a portion, of the pantothenic acid employed is incorporated into the fermentation medium subsequent to an initiation of the micro-organism growth therein. In preferred embodiments, the pantothenic acid incorporation is carried out within a time period preliminary to an observed decrease in the cell proliferation rate of the microorganism in the broth. Although such time periods will vary in actual practice, generally in the more preferred embodiments of the invention, total addition of pantothenic acid is achieved within 50 hours of the start of salicyclic acid accumulation. More advantageously, the pantothenic acid addition is achieved at the initiation of the salicylic acid accumulation, i.e., at the time of, or immediately after, inoculation of the starting nutrient medium with the microorganism.

L-glycine suitably may be added to the medium in the method of the invention in the form of free L-glycine, in admixture with D-glycine, or in the form of the basic or acid salts thereof. Specific examples of such latter forms include sodium glycinate and glycine hydrochloride, respectively.

The actual amount of L-glycine contemplated to be employed in particular embodiments of the invention will vary. The minimum amount is that sufficient to provide an increase in the total salicylic acid production as compared to that obtained in the absence thereof. The actual amount of L-glycine employed generally is in the range of from about 1 to about 500 $\gamma$/ml., preferably from about 10 to about 300 $\gamma$/ml. of total medium. As in the case of pantothenic acid, L-glycine, when employed, similarly may be incorporated into the aqueous fermentation medium at various times during the fermentation. In embodiments wherein pantothenic acid and glycine are employed together the glycine incorporation preferably is carried out simultaneously with the pantothenic acid addition.

In the present method, a particularly advantageous initial fermentation medium is an aqueous system containing from about 0.5 to about 2.5% by weight naphthalene, from about 0.5 to about 1.5% by weight ammonium hydroxide, from about 0.075 to about 0.2% by weight phosphoric acid, calcium carbonate in an amount to buffer the medium to a pH of from about 6.0 to about 7.5, and a stabilizing agent supplied by from about 0.05 to about 5 $\gamma$/ml. pantothenic acid and/or from about 10 to about 300 $\gamma$/ml. L-glycine.

In accordance with the present method, a suitable initial aqueous nutrient medium initially is inoculated with a strain of the salicylic acid-producing microorganism. The initial nutrient medium previously may have been sterilized, but such preliminary sterilization is not necessary. The amount of the inoculum employed in the inoculation step suitably may vary but generally is in the range of from about 1 to about 10% by volume of the starting fermentation medium.

A suitable inoculum may be prepared by any conventional technique known to those skilled in the fermentation art. An example of a satisfactory inoculum preparation entails transferring a 30 to 45 day-old culture of the microorganism on an agar slant to 100 cc. of sterilized nutrient medium and incubating the sample at about 30° C. for about 72 hours with agitation on a rotary shaker. About 5% by volume of the resultant culture then is transferred to an additional 100 cc. of the nutrient medium and incubated for about 48 hours at about 30° C. with the agitation being continued. The final step in the inoculum preparation then is carried out by transferring about 2.5% by volume of the resultant culture to five gallons of the nutrient medium buffered to a pH of about 6.8 to about 7.2 and incubating the resultant medium at about 30° C. for 15 to 25 hours with submerged aeration and with the pH of the medium throughout the incubation period being maintained at about 6.7 by an addition of sodium hydroxide.

Following inoculation of the fermentation production medium, the salicylic acid-producing microorganism is allowed to grow therein under submerged aerated conditions to produce salicyclic acid. In accordance with the present method the resultant fermentation generally is carried out at a temperature in a range of from about 20 to 40° C., preferably from about 25 to 35° C. Oxygen, usually in the form of air, preferably is introduced into the system at an excess of the observed oxygen consumption which generally provides a feed rate to the system in the range of from about 0.5 to about 2 standard cubic feet air per minute. Agitation of the system suitably may be carried out by conventional mechanical equipment.

During the initial phases of growth of the microorganism in the nutrient medium an increase in the cell population of the microorganism is attended by a decrease in the concentration of the respective naphthalene, nitrogen, and phosphorus sources and an increase in the concentration of salicylic acid. As indicated above, in preferred embodiments of the method to maintain naphthalene concentration at a more favorable level, additional naphthalene, either continuously or intermittently, is added to the medium. Unhindered, the pH of the fermentation broth decreases as the fermentation proceeds due in part to the production of salicyclic acid. Preferably, a suitable base such as sodium hydroxide, potassium hydroxide, or ammonium hydroxide is added, as necessary, to maintain the pH above about 5.5, and preferably between about 6.0 and about 7.5.

Under normal circumstances it has been observed that in fermentations of the initial fermentation medium with the salicylic acid-producing strains of Pseudomonas, the salicylic acid accumulation is observed to reach a maximum after which point a period follows in which the salicyclic concentration of the medium remains essentially constant or even decreases. At the above-described conditions, in the absence of the pantothenic acid and/or L-glycine stabilization, such a peak in the salicyclic acid production ordinarily occurs at a salicylic acid concentration of approximately 15 milligrams per milliliter in the resultant medium. It has been found that such a "peaking" phenomenon advantageously may be eliminated during the time period in which it ordinarily occurs by the use of the stabilization ingredients of the invention.

In accordance with the present method, the fermentation time periods suitably may vary over a relatively wide range. In preferred embodiments, time periods are employed during which salicylic acid accumulation in the fermentation broth is observed, with the fermentation being halted and salicylic acid recovery being accomplished when salicylic acid accumulation no longer occurs or the rate of accumulation diminishes below a satisfactory level, e.g., below about 0.1 mg. salicylic acid per ml. per hour. Under such conditions the actual time periods employed usually are in the range of from about 50 to 100 hours, more preferably from about 60 to about 80 hours whereby final broths containing salicylic acid in an amount in the range of from about 20 to about 30 mg. per ml. advantageously may be obtained.

Salicyclic acid produced by the present method may be recovered from the final broth or portions thereof by any suitable technique. An example of such a technique entails centrifuging the salicylic acid-containing broth to remove cells and the like, and extracting the resultant liquor after cooling with an organic solvent such as acetone, alcohol, or ether. Such methods are readily available in the literature.

The method of the invention having been described above in detail, the following examples are presented to show additional specific embodiments thereof. The examples are given merely for illustration purposes and not by way of limitation.

*Example I*

*Pseudomonas fluorescens* Bioferm Strain No. 345–E was cultivated in about 10 gallons of an aqueous medium having the following compositions—

| Ingredient: | Concentration, percent by weight |
|---|---|
| Naphthalene | 1.5 |
| Ammonium hydroxide | 0.7 |
| Phosphoric acid | 0.11 |
| Calcium carbonate | 0.1 |
| Ferrous sulfate heptahydrate | 0.005 |

The starting medium had a pH of about 7.2.

In the run, the above aqueous medium was placed in a 13 gallon tank equipped with a stirrer providing agitation and operating at about 300 r.p.m. Air was forced into the medium at a rate of about 1.4 s.c.f.m. The tank was equipped with a jacket which maintained the temperature of the medium at about 30° C.

The medium was inoculated with about 5% by volume of an inoculum of the microorganism obtained by a technique which involved initially transferring a 30 to 45 day old culture of the microorganism on an agar slant through two 72-hour transfers in 500 cc. shake flasks containing 100 cc. nutrient medium and incubated at about 30° C. The resultant second shake flask culture was then employed at about a 2.5% by volume transfer level to inoculate about 5 gallons of the nutrient medium in a seed tank and the resultant culture obtained after incubation at about 30° C. for about 48 hours with the pH being maintained at about 6.7 with sodium hydroxide being the inoculum employed to seed the 10 gallon fermentation batch.

Following inoculation of the medium described above, the microorganism was allowed to grow in the medium for about 75 hours. During the period, the pH of the system was maintained at about 6.4 to 7 by an addition of ammonium hydroxide, and naphthalene was added incrementally at a rate of about 0.4% every 6 hours.

At 35 hour and 75 hour intervals during the fermentation, salicylic acid concentration of the broth was determined by adding 1 ml. of 1% $Fe(NH_4)_2SO_4 \cdot 12H_2O$ in 5% acetic acid to 9 ml. of a suitably withdrawn and diluted fermentation broth sample. The resulting purple color of the sample was read at 530 m$\mu$ on a Coleman spectrophotometer. Concentration of salicylic acid was determined from a standard curve obtained from known solutions of salicylic acid.

The results of the test revealed a salicylic acid accumulation of 3.3 mg. per ml. and 14.1 mg. per ml. after 35 and 75 hours, respectively.

*Example II*

In order to determine the effects on salicyclic acid accumulation due to an addition of pantothenic acid, the procedure of Example I was repeated with the exceptions of adding to the starting medium, each in turn, calcium pantothenate at 0.1 $\gamma$/ml. and 1 $\gamma$/ml. levels.

The results of these tests are set forth below in Table 1. For convenience, the comparative data obtained on the control run in the absence of pantothenic acid are included.

TABLE 1

| Run No. | Calcium Pantothenate Added, $\gamma$/ml. | Salicylic Acid Accumulation, mg. per ml. | |
|---|---|---|---|
| | | 35 hrs. | 75 hrs. |
| 1 (Control) | | 3.3 | 14.1 |
| 2 | 0.1 | 7.2 | 23.7 |
| 3 | 1 | 12.8 | 22.4 |

The above data manifest the significant improvement in salicylic acid production rate and accumulation obtained by the utilization of pantothenic acid in accordance with the present method.

*Example III*

To demonstrate the results in terms of salicylic acid accumulation obtained by the use of pantothenic acid and L-glycine in combination, the procedure of Example I was repeated with the exception of adding to the starting medium a mixture of 1 $\gamma$/ml. calcium pantothenate and 38 $\gamma$/ml. racemic glycine. Cultivation of the *Pseudomonas fluorescens* microorganism in the resultant medium yielded salicylic acid accumulation of 9.6 and 25.6 mg./ml. at 35 and 75 hours, respectively.

These results establish the improved salicylic acid production utilizing the pantothenic acid-glycine mixture stabilization method of the present invention.

*Example IV*

Cultivation of the microorganism described in the above examples was carried out through two 72-hour transfers in 500 ml. shake flasks containing about 100 ml. of aqueous nutrient medium as per the procedure described in Example I in the preparation of the inoculum employed in Examples I to III. Four separate runs in the shake flasks were carried out. In the second transfer stage to the nutrient medium of one sample initially was added also 0.1 mg. calcium pantothenate, to another, about 45 mg. racemic glycine, and to another, a mixture of about 0.1 mg. calcium pantothenate and 45 mg. racemic glycine. In the fourth run, employed as the control, the second stage transfer medium was unmodified.

At the end of the 72 hour incubation the accumulation of salicylic acid in the respective cultures was determined by the method indicated in Example I. The results of this run are set forth in Table 2 below with the salicylic acid produced being indicated on a percentage of the accumulation observed in the control run.

TABLE 2

| Run No. | Calcium Pantothenate Added, γ/ml. | DL-glycine Added, γ/ml. | Salicylic Acid Accumulation, Percent of Control Run |
| --- | --- | --- | --- |
| 5 (control) | | | 100 |
| 6 | 1 | | 106 |
| 7 | | 450 | 106 |
| 8 | 1 | 450 | 113 |

The results shown above reveal the advantageous increase in salicylic acid accumulation obtained with the stabilizers of the present method when they are employed alone and in combination.

It will be apparent to those skilled in the art that other modifications may be made in the method of the invention without departing from the spirit thereof. Accordingly, it is understood that the present invention be limited only by the scope of the appended claims.

The embodiments of the invention in which an exclusive property or privilege is claimed are defined as follows:

1. A method for producing salicylic acid which comprises cultivating a salicylic acid-producing microorganism of the genus Pseudomonas in an aqueous nutrient meduim having a pH in the range of from about 5.5 to about 8 and containg naphthalene, an assimilable nitrogen source, an assimilable phosphorus source, and an added amount of a stabilizing agent selected from the group consisting of pantothenic acid, L-glycine, and mixtures thereof which effects an increase in the rate of accumulation of salicylic acid in said medium.

2. The method according to claim 1 wherein said microorganism is *Pseudomonas fluorescens*.

3. The method according to claim 1 wherein said stabilizing agent is pantothenic acid.

4. The method according to claim 3 wherein the amount of said pantothenic acid added is in the range of from about 0.01 to about 10 γ/ml. of said aqueous medium.

5. The method according to claim 1 wherein said stabilizing agent is L-glycine.

6. The method according to claim 5 wherein the amount of said L-glycine added is in the range of from about 1 to about 500 γ/ml. of said aqueous medium.

7. The method according to claim 1 wherein said stabilizing agent is a mixture of pantothenic acid and L-glycine.

8. The method according to claim 7 wherein the amount of said added pantothentic acid is in the range of from about 0.01 to about 10 γ/ml. of said aqueous medium.

9. The method according to claim 8 wherein the amount of added L-glycine is in the range of from about 1 to about 500 γ/ml. of said aqueous medium.

10. The method according to claim 1 wherein the amount of naphthalene in the initial aqueous medium is in the range of from about 0.4 to about 4% by weight of said medium.

11. The method according to claim 10 wherein during the cultivation of said microorganism in said medium additional naphthalene is incorporated into said medium.

12. The method according to claim 10 wherein said nitrogen source is an ammonium compound and said phosphorus source is an assimilable inorganic phosphate-containing compound.

13. The method according to claim 10 wherein said microorganism is *Pseudomonas fluorescens*.

14. The method according to claim 13 wherein said stabilizing agent is pantothenic acid.

15. The method according to claim 14 wherein the amount of said pantothenic acid added is in the range of from about 0.01 to about 10 γ/ml. of said aqueous medium.

16. The method according to claim 13 wherein said stabilizing agent is L-glycine.

17. The method according to claim 16 wherein the amount of said L-glycine added is in the range of from about 1 to about 500 γ/ml. of said aqueous medium.

18. The method according to claim 13 wherein said stabilizing agent is a mixture of pantothenic acid and L-glycine.

19. The method according to claim 18 wherein the amount of said added pantothenic acid is in the range of from about 0.01 to about 10 γ/ml. of said aqueous medium.

20. The method according to claim 19 wherein the amount of added L-glycine is in the range of from about 1 to about 500 γ/ml. of said aqueous medium.

21. The method according to claim 13 wherein during the cultivation of said microorganism in said medium additional naphthalene is incorporated into said medium.

22. The method according to claim 13 wherein said nitrogen source is an ammonium compound and said phosphorus source is an assimilable inorganic phosphate-containing compound.

References Cited

UNITED STATES PATENTS

| 3,183,169 | 5/1965 | Brilland | 195—28 |
| 3,272,716 | 9/1966 | Goren et al. | 195—51 |
| 3,274,074 | 9/1966 | Zajic et al. | 195—51 |

OTHER REFERENCES

Klausmeier et al.: Journal of Bacteriology, vol. 73, pp. 461–464, 1956.

A. LOUIS MONACELL, *Primary Examiner.*

L. M. SHAPIRO, *Assistant Examiner.*